United States Patent [19]

Henkel

[11] Patent Number: 4,790,682
[45] Date of Patent: Dec. 13, 1988

[54] BALL JOINT

[75] Inventor: Günther Henkel, Düsseldorf, Fed. Rep. of Germany

[73] Assignee: TRW Ehrenreich GmbH & Co. KG, Dusseldorf, Fed. Rep. of Germany

[21] Appl. No.: 65,394

[22] Filed: Jun. 23, 1987

[30] Foreign Application Priority Data

Jul. 12, 1986 [DE] Fed. Rep. of Germany ....... 3623542

[51] Int. Cl.$^4$ .............................................. F16C 11/06
[52] U.S. Cl. ..................................... 403/140; 403/135
[58] Field of Search ................. 403/140, 135, 138, 136

[56] References Cited

U.S. PATENT DOCUMENTS 3,177,020  4/1965  Dumpis .
4,318,627  3/1982  Morin ............................ 403/140 X
4,537,524  8/1985  Hanson .......................... 403/135 X

FOREIGN PATENT DOCUMENTS 1775151  5/1971  Fed. Rep. of Germany .
1953116  8/1977  Fed. Rep. of Germany .
2014555  4/1970  France .
2038928  7/1980  United Kingdom ............... 403/140

Primary Examiner—Andrew V. Kundrat
Attorney, Agent, or Firm—Tarolli, Sundheim & Covell

[57] ABSTRACT

A ball joint for motor vehicles comprises a plastic bearing member (2) located between a ball head (1) or a ball and a joint housing (3). The bearing member has a rim flange (9) that lies against an inner step (10) in the joint housing (3). A closing part has an inner surface which lies under a preload against the rim flange (9) and an outer surface engaged by a rolled-in rim (13) of the joint housing (3). The rolling process is thereby simplified and, at the same time, securing of the bearing member against rotation is achieved, while smaller variations of the operational characteristics are attained. To this end, the joint housing (3) has a second inner step (12), displaced radially outward for supporting the inner surface of the rim of the closing part. The distance, in the axial direction of the stud, between the first inner step (10) and the outer step (12) determines the maximum deformation of the rim flange (9) by the closing part lying against the rim flange under preload.

9 Claims, 1 Drawing Sheet

BALL JOINT

The invention relates to a ball joint for motor vehicles comprising a plastic bearing shell located between a ball head or a ball and a joint housing and having a rim flange lying against an inner step in the joint housing. The bearing member is held by a closing cover, the inner surface of which lies under preload against the rim flange and is held against an outer side of a rolled-in rim of the joint housing.

From German Pat. No. 1,953,116, a ball joint the bearing member of which has a rim flange which lies on an inner step of the joint housing, and is held by a rolled-in closing cover, is known. For compensating production tolerances, the bearing member has, on the stud-side end surface, elevations supported against an inner shoulder of the housing, the production tolerances of the joint housing being compensated by plastic deformation. A disadvantage of this construction is that the rim flange may be deformed by high rolling-in forces, to the point of tearing, and then no longer fulfills its sealing and holding function. Greatly varying and irregular deformation of the rim flange may also lead to greatly varying operation characteristics of the ball joint. In this known ball joint, therefore, the rolling-in process must be carried out with great precision, and the ball joint must be subsequently tested.

From German Disclosure No. 1,775,151 a ball joint, of which the bearing member lies, by resiliently deformable elevations, against the inner side of the closing cover, is also known. In this construction, production tolerances in the rolling-in of the housing cover are compensated by deformation of the elevations. However, the bearing member has no rim flange and must, therefore, be held, at the stud side, by an inner shoulder of the housing. It is insufficiently secured against twisting in the joint housing.

The object of the invention is a technically improved ball joint the bearing member of which is held secure against rotation in the joint housing, and in which the rolling-in of the closing cover can be done more easily, and requires less subsequent checking.

As a technical solution to this problem, it is proposed that the joint housing has a second inner step, displaced radially outward in relation to the first, to provide a support for the closing cover at the rim of its inner side, the distance, in the stud axis direction, from the first inner step, determining the maximum deformation of the rim flange by the closing cover that lies against it under a preload.

The essential idea of the invention consists, therefore, in that a second inner step is provided which acts as an end stop for the closing cover that protects the rim flange from high rolling-in forces and deformations which may cause damage. In a ball joint according to the invention, closing can always be effected with relatively high rolling pressure, while still insuring a position in the joint housing that is well reproducible and defined by the arrangement of the second inner step. The rolling pressure can thus be constantly determined on the maximum volume of the rolling rim, while a displacement of the rolling pressure through a fluctuation of the rolling-in rim volume is eliminated. Since the rim flange is also positioned exactly in the joint housing by the first inner step, the deformation of the rim flange by the closing cover lying against it, is very well reproducible. In this way, both sufficient holding forces and also a securing against twisting, are obtained, without the rim flange being irregularly squeezed or damaged by the bearing member to the point of tearing. Therefore, the invention both simplifies the rolling process and also establishes exactly the tension conditions for the rim flange. Consequently, the testing of the seal of the rolling rim, usual up to now, may be omitted, and more constant operation characteristics of the ball joint are to be expected In one embodiment of the invention, the rim flange has at least one deformable elevation extending in the axial direction of the stud which elevation is deformed by the closing cover lying under preload. Both plastically and resiliently deformable elevations are possible, which may be arranged on any desired side or on both sides of the rim flange. In the rolling-in of the closing cover, the deformation of the rim flange is greatly limited at the elevation(s), which already permits a good holding and securing against twisting. Since the rim flange is essentially undeformed, the total tension condition of the bearing member and, thus, its contact pressure on the ball head or the ball is practically uninfluenced by the clamping in of the rim flange. Thus, at least one elevation makes possible closer tolerances of the operational characteristics In another embodiment, the elevation(s) is (are) arranged on the rim flange exclusively on the closing side, which makes the bearing member more simply deformable in production and, in two-part bearing members, the preloading of the rim flange can be selected independently of the preload of the ball head.

In still another embodiment, at least one elevation is formed as a ridge on the rim flange around the stud axis, so that the rim flange can be evenly preloaded. If a ridge-form elevation is arranged on the closing side, it provides at the same time a sealing function, since it presents a considerable resistance to moisture because of its high surface pressure. However, cam-form elevations may also be arranged on the rim flange. They provide a very effective securing against twisting.

In yet another embodiment, the closing part is a closing ring for securing the bearing member against an opening at the ball stud side, and may be provided, for example, in a ball joint with one ball and two studs. This embodiment is also appropriate for joint housings with a housing bottom formed integrally therewith.

In another embodiment, the closing part is a closing cover for closing of a ball joint with a ball head and has, at the same time, holding and sealing functions Especially with ridge-form elevations running around the rim flange on the closing side, a ball joint is obtained, effectively protected against the prenetration of water.

Other details and advantages of the subject invention will become apparent from the description which follows with reference to respective drawings, in which a preferred embodiment of a ball joint according to the invention is shown. In the drawings.

Figure 1:
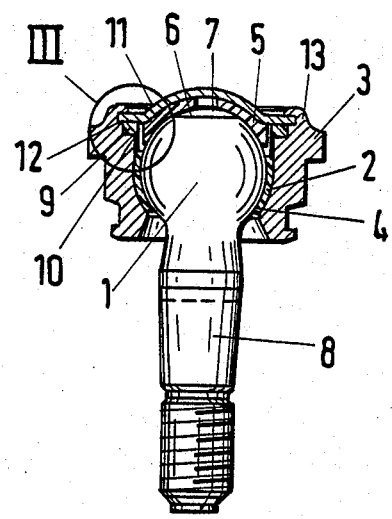
FIG. 1 shows a longitudinal section of the assembled ball joint with a closing cover and outer and inner shells.

A ball joint according to the invention shown in FIG. 1 has a ball head 1 located with interposition of a bearing member 2, in a joint housing 3. The bearing member 2 consists of an outer shell 4 and an inner shell 5 received in an end opening of the outer shell 4. Between the inner shell 5 and a pole cap 6 of the ball head 1, a grease reservoir 7 is formed.

The outer shell 4 is located in a housing inner bore and tapers toward an opening for a ball stud 8, and also has, on the end opposite the ball stud 8, a circumferential rim flange 9. The rim flange 9 is supported, on the one hand, against an annular inner step 10 in the joint housing 3, and on the other hand, is held in the joint housing by a closing cover 11. The rim flange 9 has an elevation on the closing side which can hardly be seen, however, in FIG. 1, and will be explained later with reference to FIG. 2. The closing cover 11 lies against a second circumferential inner step displaced radially outward of the joint housing 3. The cover is held by a flanged rolling rim 13 of the joint housing 3.

Figure 2:
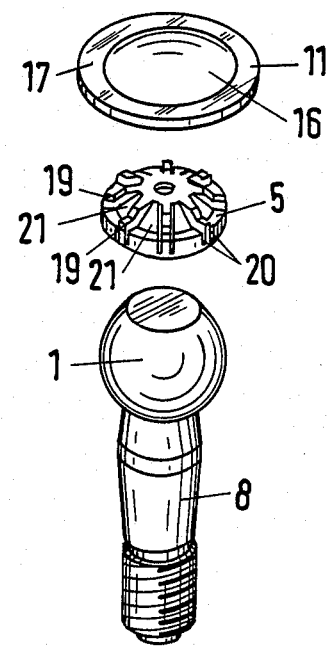
FIG. 2 shows an exploded view of the same ball joint.

As shown in FIG. 2, the ball joint is assembled by first setting the outer shell 4 into a closing-side opening 14 of the joint housing 3. The outer shell 4 is sufficiently centered when assembled by its rim flange 9 on the first inner step 10 of the joint housing 3. Then the ball stud 8 is pushed in until the ball head 1 rests in the outer shell.

Then the inner shell 5 is put on the ball head 1, being held, sidewise, by the inner rim of an end-side opening 15 of the outer shell 4. Finally, the closing cover 11 is set with its central dome 16 engaging the inner shell 5, while, at the same time, the cover engages by its flat rim 17 a ridge-form circumferential elevation 18 of the outer shell 4. By rolling-in the rim 13, finally, the closing cover 11 is clamped by the elevation 18 of the rim flange 9, until the inner surface of its rim lies against the second inner step 12 which displaced radially outward in the joint housing 3.

The inner shell 5 is provided on its end with ridges 19 and adjoining slots 20. The ridges 19 lie against the inner surface of the dome 16, and increase the form resiliency of the inner shell 5, so that the latter can better compensate measurement tolerances, and can better damp shocks in the axial direction of the stud. The maximum deformation of the ridges 19 is reached when they are pressed into the slots 20, so that stops 21 lie against the inner surface of the dome 16. By suitable dimensioning, it can also be obtained that the ridges, bulged to the side, lie against the side surfaces of the slots 20.

Figure 3:
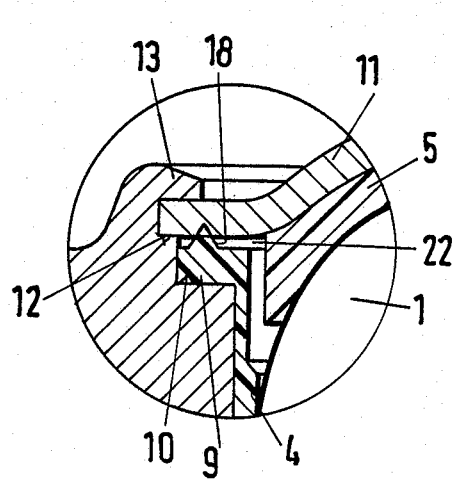
FIG. 3 shows a partial section III of FIG. 1, on a larger scale.
Figure 3:
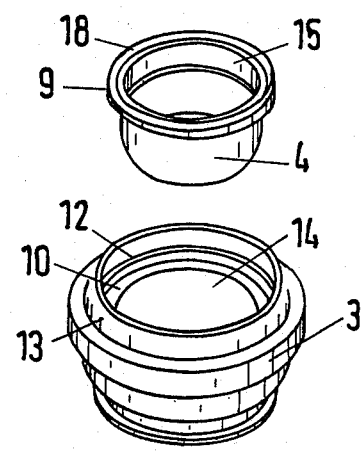

As shown in FIG. 3, the first inner step 10 is so spaced from the second inner step 12 which radially displaced outward, that a gap 22 is formed between the closing cover 11 and the rim flange 9 of the outer shell 4. In this way, the rim flange 9 is prevented from being excessively deformed.

Into the gap 22 projects a pointed, circumferential elevation 18, of which the dimensions, undeformed, exceed the height of the gap 22, as shown in FIG. 3.

With the closing cover 11 set in and clamped by means of the rolled-in rim 13, the elevation 18 is deformed, so that a force, holding the outer shell 4, builds up in the axial and circumferential direction. By suitable dimensioning, provisions are made, preferably, for resilient deformation of the elevation 18, so that the resilient return force can compensate for any tolerances of the housing parts. The height of the gap 22 amounts, with closing cover 11 set in, to about 0.2 mm. This insures that only the elevation 18 of the rim flange 9 lies against the closing cover 11.

The circumferential elevation 18 has, besides a holding function, also a sealing function, since it prevents the penetration of moisture through the gap 22 and, on the other hand, effectively prevents a loss of lubricant. A very high surface pressure in the contact zone of the elevation 18 with the closing cover 11 insures that an excellent sealing effect is obtained.

The inner shell 5 is clamped between the closing cover 11 and the ball head 1, by which the preload of the ball joint is determined. The preload is crucially determined by the distance between the inner steps 10 and 12, so that a ball joint with close-tolerance operational characteristics is obtained

I claim:

1. A ball joint for motor vehicles comprising a plastic bearing member (2) located between a ball head (1) or a ball and a joint housing (3) and having a rim flange (9) lying on an inner step (10) in the joint housing (3), and a preload closing part having an inner surface lying against the rim flange (9) and portions of the bearing member which are adjacent to the rim flange (9) and an outer surface engaged by a rolled-in rim (13) of the joint housing (3), the joint housing (3) having a second inner step (12) displaced radially outward relative to the first step for supporting the inner surface of a rim of the closing part, the distance, in the axial direction, between the first inner step (10) and the second inner step (12) controlling the maximum deformation of the rim flange (9) by the closing part which lies against the rim flange under preload, characterized in that the bearing member comprises an outer shell (4) having the rim flange (9), and an inner shell (5), and that the inner shell is received in an opening (15) of the outer shell defined by the rim flange (9), the closing part engaging the inner shell with a preload.

2. Ball joint according to claim 1, characterized in that the rim flange (9) has at least one deformable elevation (18), extending in the axial direction of the stud, which elevation is deformed by the closing part that engages it under preload.

3. Ball joint according to claim 2, characterized in that the elevation(s) (18) is (are) arranged on the rim flange (9) exclusively on the closing side.

4. Ball joint according to claim 2 or 3, characterized in that the at least one ridge-form elevation (18) on the rim flange (9) extends around the axis of the ball stud.

5. Ball joint according to one of claims 2 or 3, characterized in that cam-form elevations are arranged on the rim flange (9).

6. Ball joint according to one of claims 1, 2, or 3, characterized in that the closing part is a closing ring for securing the bearing member (2) in an opening on the ball stud side.

7. Ball joint according to one of claims 1, 2 or 3, characterized in that the closing part is a closing cover (11) for the closing of the ball joint.

8. A ball joint comprising:

a housing;

a ball stud having a ball head disposed in said housing and a shank portion projecting from said housing;

an elastically deformable bearing member interposed between said ball head and said housing, said bearing member comprising an outer shell having a rim flange defining an opening, and an inner shell received in said opening; and a closing member for closing one end of said housing and for preloading said bearing member, said closing member having a rim portion and an inner surface engaging said flange and said inner shell when said closing member closes the one end of the housing, said closing member preloading said inner shell to exert a predetermined pressure on said ball head;

said housing having a first inner step for engaging said rim flange of said outer shell when said bearing member is received in said housing, a second inner step displaced axially and radially outwardly relative to said first inner step for supporting said rim portion of said closing member, and a rolled-in rim for engaging said rim portion of said closing member to effect preloading of said bearing member, the axial distance between said first and second inner steps controlling the maximum clamping force acting on said rim flange.

9. A ball joint as set forth in claim 8 wherein said rim flange has at least one deformable axially extending elevation preloaded by said closing member.

* * * * *